Patented Sept. 8, 1936

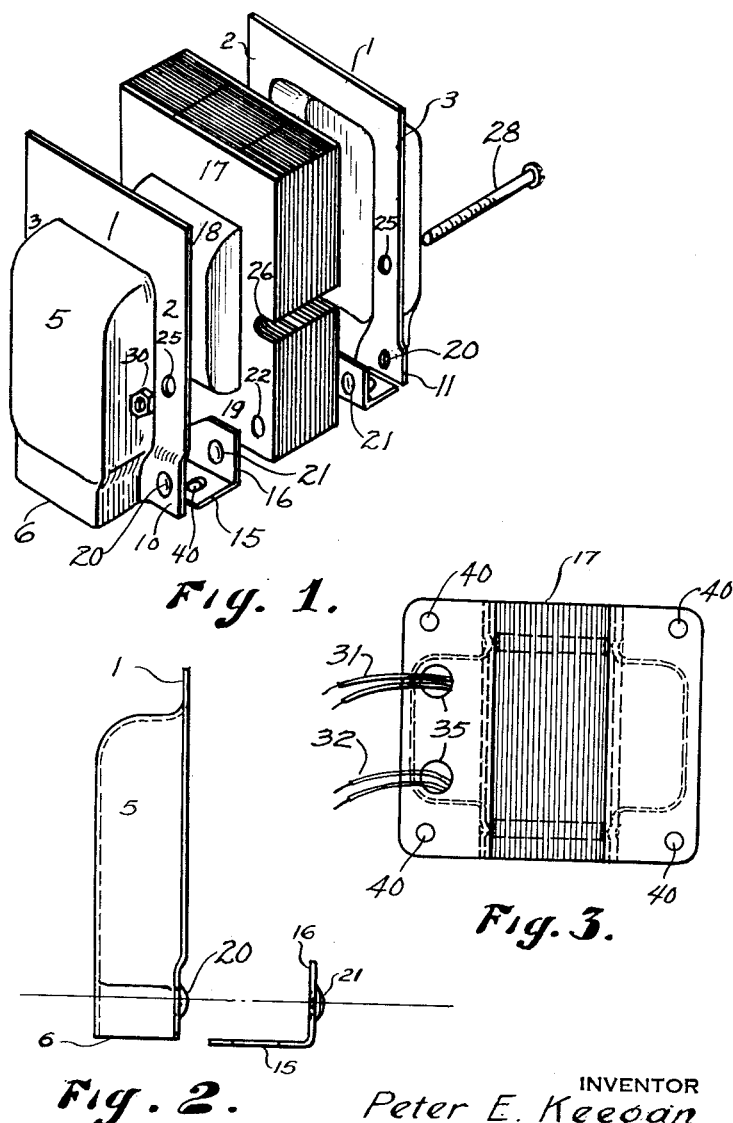

2,053,339

UNITED STATES PATENT OFFICE 2,053,339

TRANSFORMER CASING

Peter E. Keegan, Chicago, Ill., assignor to Chicago Transformer Corporation, Chicago, Ill.

Application June 26, 1935, Serial No. 28,400

1 Claim. (Cl. 175—356)

This invention relates to transformers and particularly to the construction shown and claimed in Patent 2,007,681, granted July 9, 1935, upon which this present construction is an improvement. In the patent referred to, a bell for covering the side of small transformers is disclosed. This bell is provided with an angle piece so that when two bells are bolted on opposite sides of a transformer, substantially complete coverage of the transformer windings is effected. In particular, the bottom is protected by each angle piece.

In this application, the angle piece for each end casing or bell is detachable and self aligning thereby permitting a substantially complete assembly of the transformer prior to the insertion of the angle pieces. In this way, leads may be adjusted and insulation disposed within the casings prior to the final closing of the bottoms by angle pieces.

In the drawing, Fig. 1 is an exploded view of a transformer provided with end casings and angle pieces.

Fig. 2 is a side detail of an end casing and angle piece.

Fig. 3 is a bottom view of a complete transformer.

The casing comprises a pressed sheet metal member having a top rim 1 and side rims 2 and 3. The interior region 5 of the casing is bulged out and extends to the bottom 6 of the casing.

To close the bottom of the casing, there are provided offset portions 10 and 11 of rims 2 and 3, the offset being about equal to the thickness of the metal. An angle piece 15 having a vertical portion 16 is adapted to be disposed across the bottom of the casing to close the region exposed by the bulged out end 6 of the casing.

It will be noted that the end casings are disposed on opposite sides of a stack of transformer laminations 17 having windings 18 enclosed thereby and projecting from each side thereof. Rims 1 to 3 inclusive and vertical edge 16 of angle piece 15 all lie in one plane and fit snugly against the stack 17.

In order that the end casing and angle piece register, I preferably provide indentations 20 on offsets 10 and 11 and indentations 21 on vertical parts 16 corresponding in position to indentations 20. If desired the laminations 17 may be apertured at 22 in registration with indentations 20 and 21.

To assemble the transformer, apertures 25 are provided along rims 2 and 3 of the casings and corresponding slots 26 are provided in laminations 17. A bolt 28 is threaded through registering apertures 25 and slot 26 and a nut 30 screwed on. Bolts 28, one on each side of the transformer, may be so adjusted that angle pieces 15 may have their vertical edges 16 slipped into place and thereafter the entire structure is tightened. Wires 31 and 32 may be threaded through apertures 35 in angle piece 15. The entire structure may be mounted by means of apertures 40 in the angle pieces.

What I claim is:

A transformer comprising windings and a core surrounding said windings and having a flat region around said windings on each side of said core, a pair of end casings, one on each side of said core, to enclose said windings therebetween, each casing comprising a generally rectangular metallic member having rims along three sides thereof with the central portion thereof bulged out to the fourth side, the rims adjacent the fourth side being offset for a portion of the length thereof in the same direction as the bulge, the remainder of the two rims and the third rim lying in one plane, and an angle piece having its sides at right angles to each other disposed so that one portion thereof forms a fourth rim and the other portion thereof closes the open region formed by the bulge at the fourth side, said one portion lying over the offset portions and being thick enough so that the fourth rim thus formed is in the same plane as the other three rims, interfitting indentations formed on said offset portions and on contiguous parts of the angle piece for aligning said offset portions and angle piece, and means for bolting said end casings against said flat core regions, whereby the transformer and end casings are rigidly held to said angle pieces when said bolts are tightened but readily removable therefrom when said bolts are loosened.

PETER E. KEEGAN.